(12) United States Patent (10) Patent No.: US 8,954,508 B2
Hiramatsu (45) Date of Patent: Feb. 10, 2015

(54) COMMUNICATION APPARATUS, CONTROL METHOD OF COMMUNICATION APPARATUS, COMMUNICATION SYSTEM, AND PROGRAM

(75) Inventor: Tomoki Hiramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 13/278,484

(22) Filed: Oct. 21, 2011

(65) Prior Publication Data

US 2012/0110100 A1 May 3, 2012

(30) Foreign Application Priority Data

Oct. 28, 2010 (JP) .................................. 2010-242463
Oct. 28, 2010 (JP) .................................. 2010-242464

(51) Int. Cl.
*G06F 15/16* (2006.01)
*H04L 29/12* (2006.01)
(52) U.S. Cl.
CPC ........... *H04L 61/2575* (2013.01); *H04L 61/103* (2013.01); *H04L 61/2514* (2013.01)
USPC ............................. 709/205; 709/204; 709/206
(58) Field of Classification Search
CPC ......... H04L 51/04; H04L 51/32; H04L 51/00; G06F 15/16
See application file for complete search history.

(56) References Cited

U.S. PATENT DOCUMENTS

| 2001/0010061 A1* | 7/2001 | Matsumoto | 709/249 |
| 2005/0204060 A1* | 9/2005 | Maekawa et al. | 709/245 |
| 2005/0275885 A1* | 12/2005 | Sugiyama | 358/1.15 |
| 2007/0033192 A1* | 2/2007 | Sakoh et al. | 707/10 |
| 2011/0157004 A1* | 6/2011 | Ohashi | 345/156 |
| 2011/0163858 A1* | 7/2011 | Ohashi | 340/12.5 |

FOREIGN PATENT DOCUMENTS

| JP | 2004-15685 A | 1/2004 |
| JP | 2008-236278 A | 10/2008 |

* cited by examiner

*Primary Examiner* — Umar Cheema

(74) *Attorney, Agent, or Firm* — Canon USA, Inc. IP Division

(57) ABSTRACT

An apparatus to communicate with a partner includes a transmission unit configured to directly transmit address information of the apparatus to the partner, a reception unit configured to receive data from the partner connected to the apparatus via a relay apparatus, using the address information, an acquisition unit configured to acquire global address information corresponding to the partner from the received data, and a notification unit configured to notify the communication partner of the acquired global address information.

13 Claims, 11 Drawing Sheets

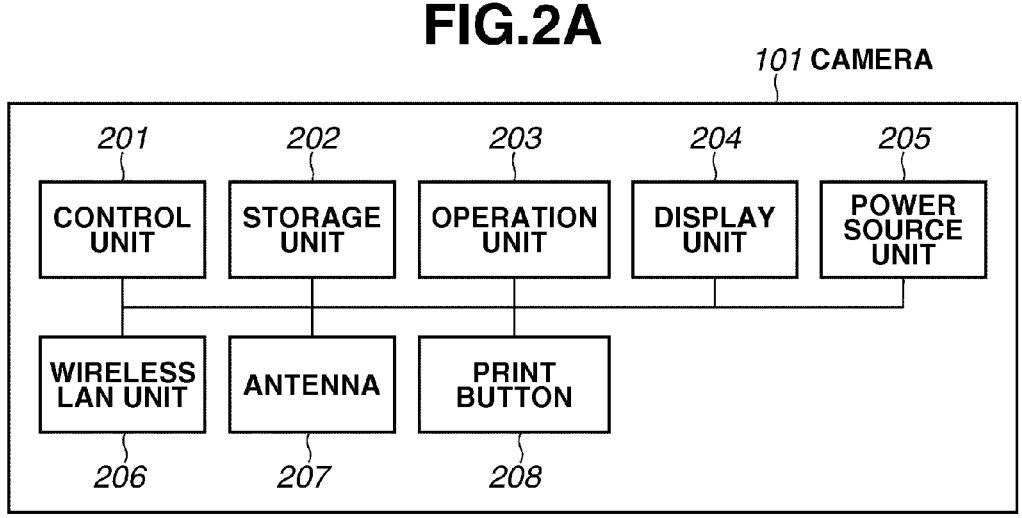
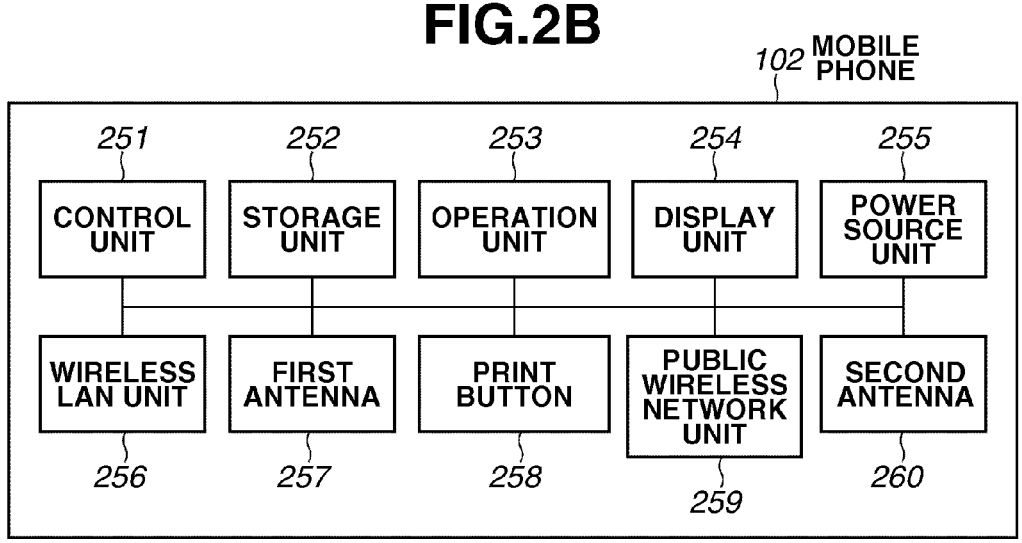

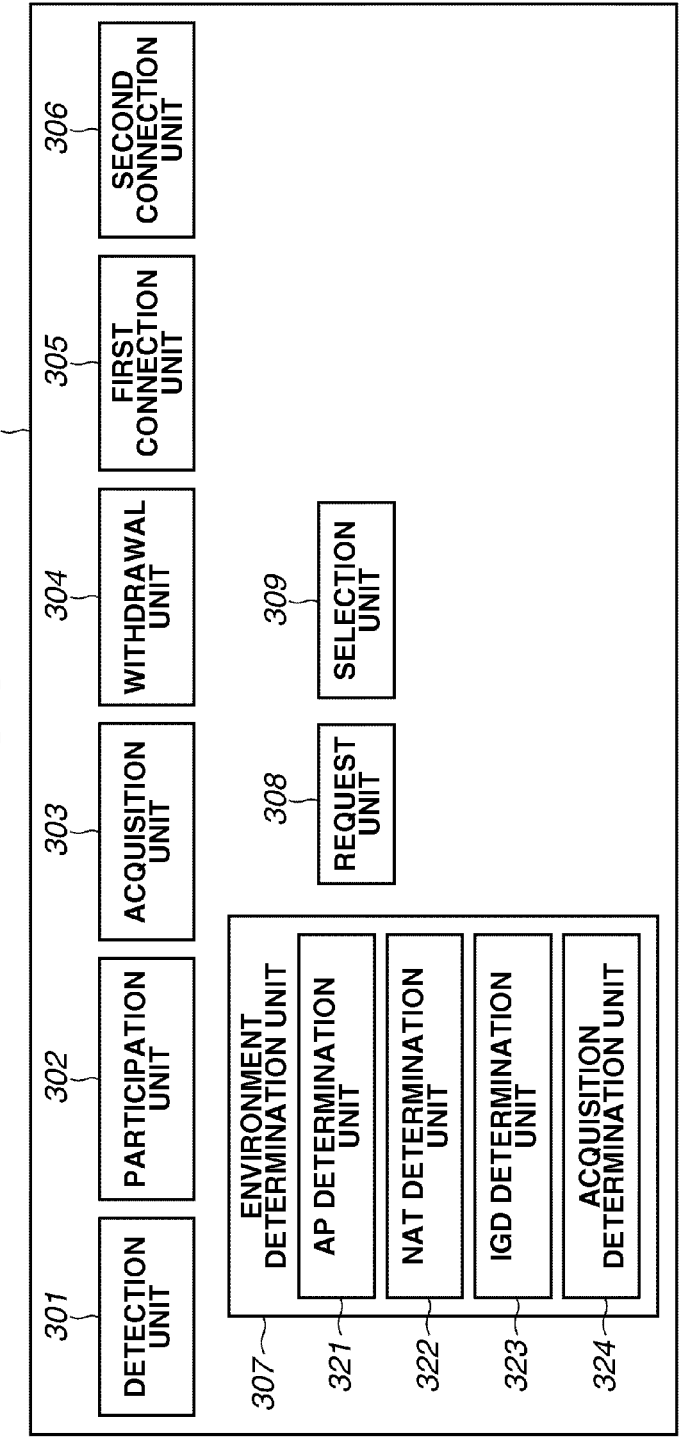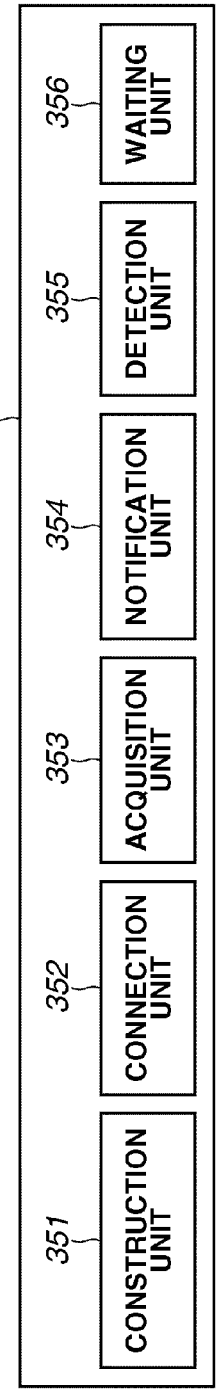

FIG.4

| | NW ENVIRONMENT a | NW ENVIRONMENT b | NW ENVIRONMENT c | NW ENVIRONMENT d |
|---|---|---|---|---|
| CONNECTION FROM COMMUNICATION PARTNER VIA INTERNET | ○ | × | × | × |
| UDP hole punching | ○ | ○ | × | × |
| CONNECTION TO COMMUNICATION PARTNER VIA INTERNET | ○ | ○ | ○ | × |

○ : POSSIBLE   × : IMPOSSIBLE

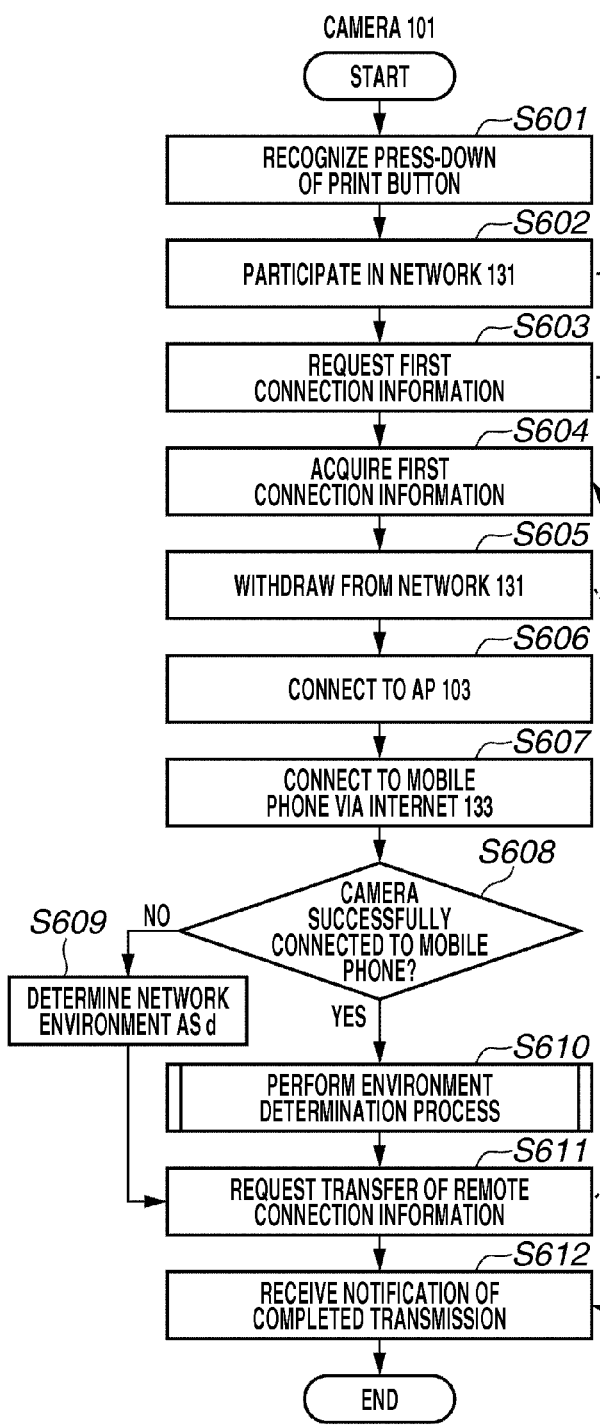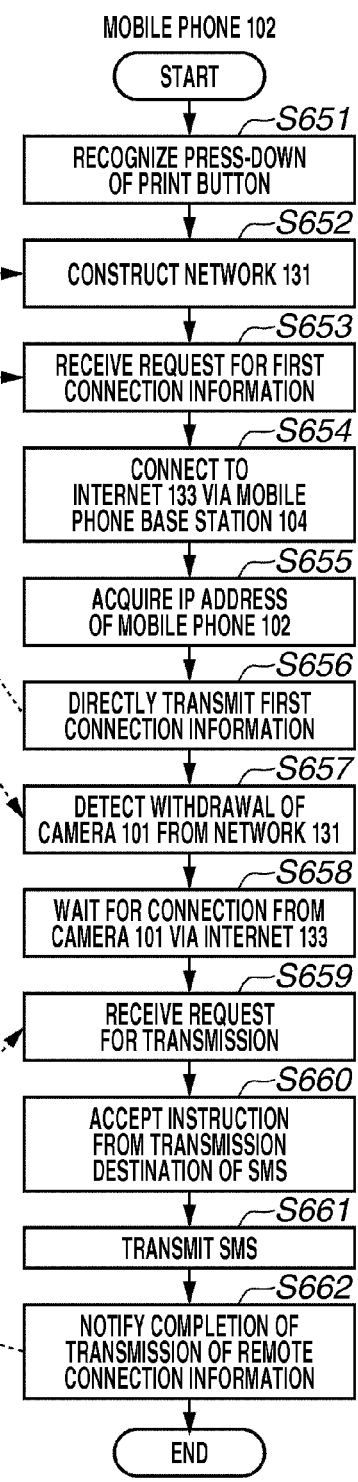

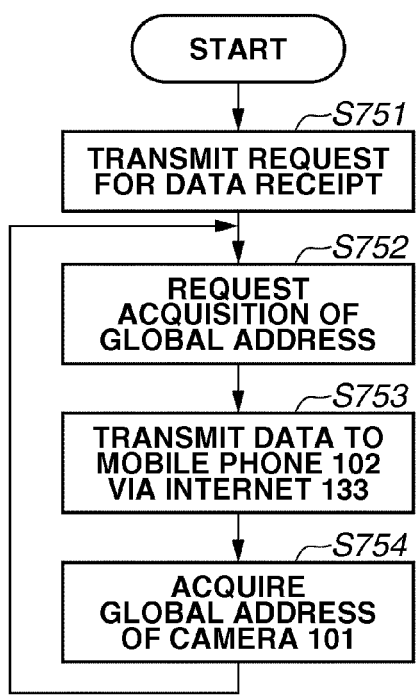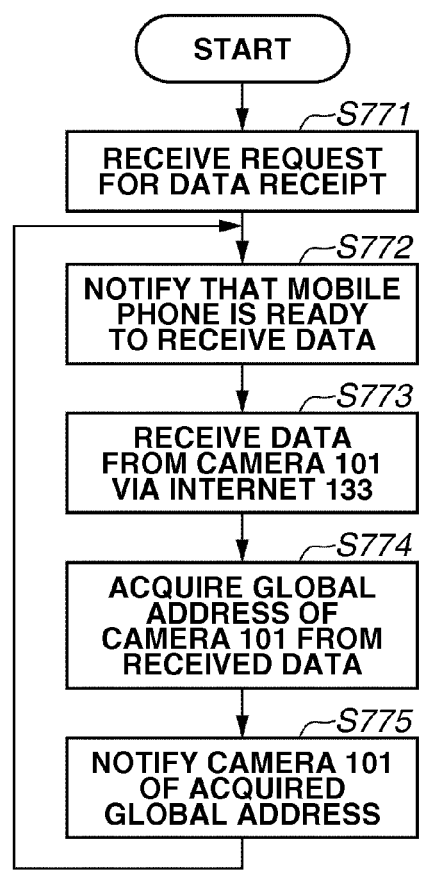

COMMUNICATION APPARATUS, CONTROL METHOD OF COMMUNICATION APPARATUS, COMMUNICATION SYSTEM, AND PROGRAM

BACKGROUND OF THE INVENTION

1. Field of the Invention

The present invention relates to a system where a communication apparatus communicates with a communication partner through a relay apparatus.

2. Description of the Related Art

Network address translation (NAT) and network address port translation (NAPT) are technologies for translation between an Internet Protocol (IP) address (private address) used within a private network and IP address (global address) used outside the private network.

So far, various methods have been discussed that enable an apparatus incorporated in a private network to obtain a global address translated by the NAT.

For example, a method has been discussed that uses a Simple Traversal of User Datagram Protocol (UDP) through NATs (STUN) server. In the method, an apparatus in a private network sends a request for a global address to a STUN server outside the private network, and the STUN server sends a global address to the apparatus as required.

Japanese Patent Application Laid-Open No. 2004-15685 discusses a method in which a communication apparatus generates an electronic mail to be sent to the apparatus itself, and transmits the mail to a mail server outside a private network, so that a global address is acquitted out of header information of the mail transmitted from the mail server to the communication apparatus.

In the case, however, where a global address is acquired using an external server (e.g., a STUN server or a mail server), storage of an IP address of the external server in advance is required. In addition, if the IP address is changed or the external server is halted, the target global address cannot be acquired.

SUMMARY OF THE INVENTION

According to an aspect of the present invention, an apparatus to communicate with a partner is provided. The apparatus includes a transmission unit configured to directly transmit address information of the apparatus to the partner, a reception unit configured to receive data from the partner via a relay apparatus, using the address information, an acquisition unit configured to acquire global address information corresponding to the partner from the received data received, and a notification unit configured to notify the partner of the acquired global address information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B each illustrate a hardware configuration.

FIGS. 3A and 3B each illustrate a software configuration.

FIG. 4 is a sequence chart.

FIGS. 6A and 6B each are a flowchart.

FIGS. 7A to 7C each are a flowchart.

DESCRIPTION OF THE EMBODIMENTS

Various exemplary embodiments, features, and aspects of the invention will be described in detail below with reference to the drawings.

Figure 1:
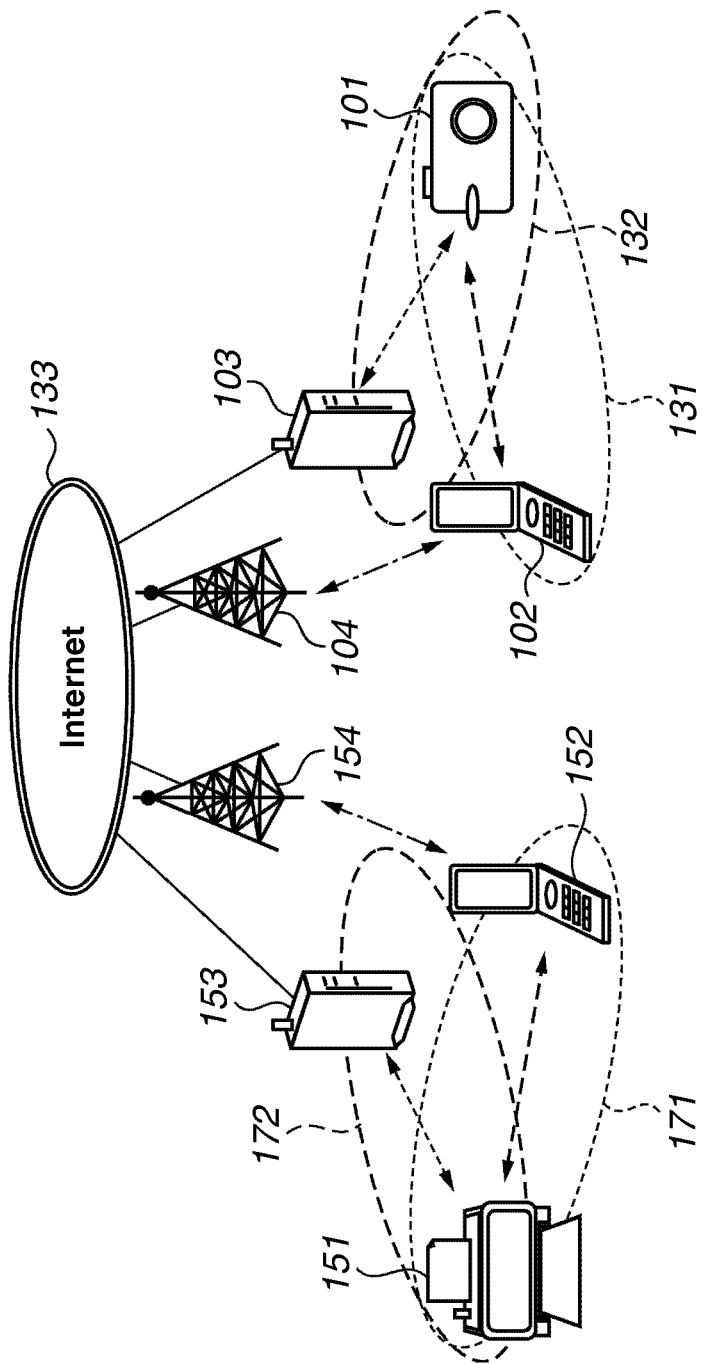
FIG. 1 illustrates a network configuration.

A first exemplary embodiment is described. FIG. 1 illustrates a network configuration of a communication system according to the present exemplary embodiment. The communication system includes a digital camera (hereinafter, referred to as camera) 101 as a communication apparatus, and a mobile phone 102 that constructs a network 131 complying with an ad hoc mode standardized by Institute of Electrical and Electronic Engineers (IEEE) 802.11 series. Further, the mobile phone 102 can connect to a telephone base station 104 using a public wireless network, and to the Internet 133 as a backbone network through the telephone base station 104. The public wireless network is a wireless communication complying with Long Term Evolution (LTE) standard, but may be a wireless communication complying with the other standard such as International Multimedia Telecommunications (IMT).

An access point (hereinafter, referred to as AP) 103 constructs a network 132 complying with an infrastructure mode defined by IEEE 802.11 series. The AP 103 connects to the Internet 133 via wire. The AP 103 of the present exemplary embodiment is an AP accessed by limited users at home or office for example. Such a network constructed with the AP 103 is called home network. In contrast, a network constructed with one or more APs and accessed by many and unspecified people is called public wireless local area network (LAN). The AP 103 has a NAT/NAPT function to assign a private address to an apparatus (i.e., the camera 101 in the present exemplary embodiment) connected to the AP 103. Hereinafter, the NAT/NAPT function is simply referred to as NAT function. Packets control such as Firewall is not performed between the home network and public wireless LAN in the present exemplary embodiment and the Internet 133.

The NAT assigns a private address that is an IP address used only within the network 132 to each of the communication apparatuses within the network 132. The NAT performs mutually conversion between the assigned private address and a global address that is an IP address used in the external Internet 133.

The camera 101, when participating in the network 132, can connect to the Internet 133 through the AP 103. Alternatively, the camera 101, when participating in the network 131, can connect to the Internet 133 through the mobile phone 102.

In the present exemplary embodiment, wireless communication complying with IEEE 802.11 series can be established between the camera 101 and the mobile phone 102, and the camera 101 and the AP 103, but the communication may be based on the other wireless communication system such as Bluetooth (trademark), Ultra Wide Band (UWB), Multi Band Orthogonal Frequency Division Multiplexing (OFDM) Alliance (MBOA), and ZigBee, the UWB including Wireless USB, Wireless 1394, and Wireless Networks (WINET).

A printer 151 can participate in a network 171 that is constructed with a mobile phone 152 and complying with ad hoc mode. The printer 151 can participate in a network 172 that is constructed with an AP 153 and complying with an infrastructure mode. The mobile phone 152 can connect to a telephone base station 154 using a public wireless network, and to the Internet 133 through a telephone base station 154. The AP 153 connects to the Internet 133 via wire. Accordingly, the printer 151 can connect to the Internet 133 through the mobile phone 152 or the AP 153.

FIG. 2A briefly illustrates a hardware configuration of the camera 101. The printer 151 has a hardware configuration similar to that in FIG. 2A.

A control unit 201 is configured to control the entire camera 101 by executing a computer program (hereinafter, referred to as program) stored in a storage unit 202, the control unit 201 being composed of computers such as a central processing unit (CPU) and a micro-processing unit (MPU). The storage unit 202 is configured to store information such as programs executed by the control unit 201, parameters for communication, and a Media Access Control (MAC) address (device-specific information) of the connected AP 103. The later-described various operations are implemented when the control unit 201 respectively executes programs stored in the storage unit 202. The storage unit 202 may adopt memories such as read only memory (ROM) and random access memory (RAM), flexible disk, hard disk, optical disk, magneto-optical disk, CD-ROM, CD-R, magnetic tape, non-volatile memory card, and DVD.

An operation unit 203 is configured to allow a user to operate the camera 101. A display unit 204 is configured to display various information to a user. A display unit 204 includes a function to output visibly recognizable information using liquid crystal display (LCD) or light emitting diode (LED) and to output audio information using speaker. A power source unit 205 is configured to supply power to the camera 101.

A wireless LAN unit 206 is for wireless communication complying with IEEE 802.11 series. The wireless LAN unit 206 controls wireless LAN communication complying with IEEE 802.11 series, and performs protocol processing related to the wireless LAN communication. An antenna 207 is used when wireless communication is performed by the wireless LAN unit 206. A remote direct print button (hereinafter, referred to as print button) 208 is to execute printing in remote connection mode. The remote connection refers to the connection form to connect to the camera 101 and the printer 151 through the Internet 133.

FIG. 2B briefly illustrates a hardware configuration of the mobile phone 102. The mobile phone 152 has a hardware configuration similar to that in FIG. 2B.

A control unit 251 is configured to control the entire mobile phone 102 by executing a program stored in a storage unit 252 and composed of computers such as a CPU and an MPU. the storage unit 252 is configured to store information such as programs executed by the control unit 251 and parameters for communication. The later-described various operations are implemented when the control unit 251 respectively executes programs stored in the storage unit 252. The storage unit 252 may adopt memories such as ROM and RAM, flexible disk, hard disk, optical disk, magneto-optical disk, CD-ROM, CD-R, magnetic tape, non-volatile memory card, and DVD.

An operation unit 253 is configured to allow a user to operate the mobile phone 102. An operation unit 253 includes a microphone used by a user for phone call. A display unit 254 is configured to display various information to a user. A display unit 254 includes a function to output visibly recognizable information using LCD or LED and to output audio information using speaker. A power source unit 255 is configured to supply power to the mobile phone 102.

A wireless LAN unit 256 is for wireless communication complying with IEEE 802.11 series. The wireless LAN unit 256 controls wireless LAN communication complying with IEEE 802.11 series, and performs protocol processing related to wireless LAN communication. A first antenna 257 is used when wireless communication is performed by the wireless LAN unit 256 A remote direct print button (hereinafter, referred to as print button) 258 is to execute printing in remote connection mode described below.

A public wireless network unit 259 is for public wireless communication. The public wireless network unit 259 controls public wireless communication and performs protocol processing related to the public wireless communication. A second antenna 260 is used when wireless communication is performed by the public wireless network unit 259.

FIG. 3A is a software function block diagram that is realized by the control unit 201 of the camera 101 reading programs stored in the storage unit 202. Among the blocks, part of the function blocks may be configured as hardware such as application-specific integrated circuit (ASIC), or a plurality of function blocks may be combined to realize one function block. In addition, the operation system (OS) operated in the camera 101 may partially or entirely perform actual processes to achieve the above described functions. The printer 151 has a similar software function block.

A detection unit 301 is configured to detect networks therearound using the wireless LAN unit 206 and the antenna 207. The detection unit 301 detects networks constructed in ad hoc mode complying with IEEE 802.11 series. In the networks in ad hoc mode, communication can be established among apparatuses participated in the network. A participation unit 302 is configured to cause the camera 101 to participate in a network detected by the detection unit 301 using the wireless LAN unit 206 and the antenna 207.

An acquisition unit 303 configured to request a mobile phone for connection information using wireless LAN unit 206 and the antenna 207, and to acquire first connection information from the mobile phone. The first connection information is necessary for connection between the camera 101 and a mobile phone through the Internet, and specifically includes an IP address, an encryption key, and a port number of a target mobile phone. A withdrawal unit 304 is configured to cause the camera 101 to withdraw from (i.e., leave) a network where the camera 101 is caused to participate in by the participation unit 302.

A first connection unit 305 is configured to connect the camera 101 to an AP using the wireless LAN unit 206 and the antenna 207. A second connection unit 306 is configured to connect the camera 101 to a mobile phone using connection information acquired by the acquisition unit 303. An environment determination unit 307 is configured to determine a network environment where the camera 101 belongs. In the present exemplary embodiment, the network environment is divided into four groups illustrated in FIG. 4, where the symbol "NW" is the abbreviation of "network".

The network environment "a" in FIG. 4 does not have the NAT function, or has Internet Gateway Device (IGD) function to allow the camera 101 to recognize a global address that is used by the camera 101 to transmit data to the Internet 133. More specifically, in the network environment "a", there is no NAT, or there is NAT, but the camera 101 can recognize a global address by the IGD function defined by Universal Plug and Play (UPnP). The IGD function notifies the camera 101 of a global address given by NAT. In the cases where a network has only one NAT, the IGD function notifies the camera 101 of a global address. However, in the cases where the camera 101 connect to the Internet 133 through a plurality of NATs (hereinafter, referred to as multi-level NAT), IGD function cannot notify the camera 101 of a global address. In the cases with only one NAT, the IGD can be used to relay a packet from the Internet 133 to the camera 101 through the AP 103, the packet specifying a global address and a port number. In the network environment "a", connection between the camera 101 and a communication partner via the Internet 133 can be established in both ways.

The network environment "b" in FIG. 4 having multi-level NAT cannot notify the camera 101 a global address using the IGD function. In the network environment "b", however, in the cases where the camera 101 can recognize a global address through another approach, the communication partner can connect to the camera 101 through the Internet 133 using UDP hole punching. Also, the camera 101 can connect to the communication partner. The UDP hole punching enables direct connection between apparatuses even when the connection passes through an AP having NAT. More specifically, one apparatus A transmits a User Datagram Protocol (UDP) packet to another apparatus B by specifying a global address and a port number. The AP on the apparatus A side relays a packet from the apparatus B to the apparatus A, in response to the packet transmission from the apparatus A to the apparatus B. Consequently, the apparatus B can connect to the apparatus A.

A network environment "c" does not accept a request for connection from the external Internet 133. In general, a public wireless LAN does not accept a request for connection from the external Internet 133, from the viewpoint of security. In the network environment "c", the communication partner cannot connect to the camera 101 through the Internet 133, but the camera 101 can connect to the communication partner through the Internet 133. A network environment "d" does not allow connection of the camera 101 to the Internet 133 via an AP. In the present exemplary embodiment, the camera 101 connects to the Internet 133 through the mobile phone 102 without fail. And the printer 151 connects to the Internet 133 through the mobile phone 152 without fail.

Again, the software function block diagram is described. The environment determination unit 307 further includes unit blocks 321 to 324 therein. The AP determination unit 321 determines whether an AP in connection with the camera 101 constructs a public wireless LAN or a home network. The NAT determination unit 322 determines whether there is a NAT in the network 132 where the camera 101 connects. The NAT determination unit 322 further determines whether the NAT of the network 132 is a multi-level NAT or not. The IGD determination unit 323 determines whether there is an apparatus having IGD function in the network 132. The acquisition determination unit 324 determines whether a global address of the camera 101 can be acquired using the mobile phone 102.

A request unit 308 is configured to request the mobile phone 102 to transfer remote connection information thereto so that an external apparatus (herein, the printer 151) connects to the camera 101. A selection unit 309 is configured to select a connection form when the camera 101 communicates with an external apparatus (herein, the printer 151).

FIG. 3B is a software function block diagram that is realized by the control unit 251 of the mobile phone 102 reading out programs stored in the storage unit 252. Among the software function blocks, part of the software function blocks may be configured with hardware such as ASIC, or a plurality of function blocks may be combined to realize one function block. In addition, the OS operated in the camera 101 may partially or entirely perform actual processes to achieve the above described functions.

A construction unit 351 is configured to construct a network 131 using the wireless LAN unit 256 and the first antenna 257, the network 131 enabling communication in ad hoc mode complying with IEEE 802.11 series. A connection unit 352 is configured to connect the mobile phone 102 to a telephone base station using the public wireless network unit 259 and the second antenna 260, and to the Internet through the telephone base station. An acquisition unit 353 is configured to acquire an IP address of the mobile phone 102 from a Dynamic Host Configuration Protocol (DHCP) server on the Internet connected to the mobile phone 102 by the connection unit 352.

A notification unit 354 configured to notify the camera 101 of connection information using the wireless LAN unit 256 and the first antenna 257, the information containing an IP address that is acquired by the acquisition unit 353. The information further contains an encryption key which is generated by the mobile phone 102 to be notified to the camera 101. The encryption key may, however, be stored in the mobile phone 102 in advance to be notified to the camera 101. A detection unit 355 is configured to detect withdrawal of the camera 101 from the network 131 constructed by the construction unit 351. A waiting unit 356 is configured to wait for connection of the camera 101 to the mobile phone 102 through a public wireless network via a telephone base station. The waiting unit 356 also waits for a data reception request from the camera 101 through a public wireless network.

Figure 5:
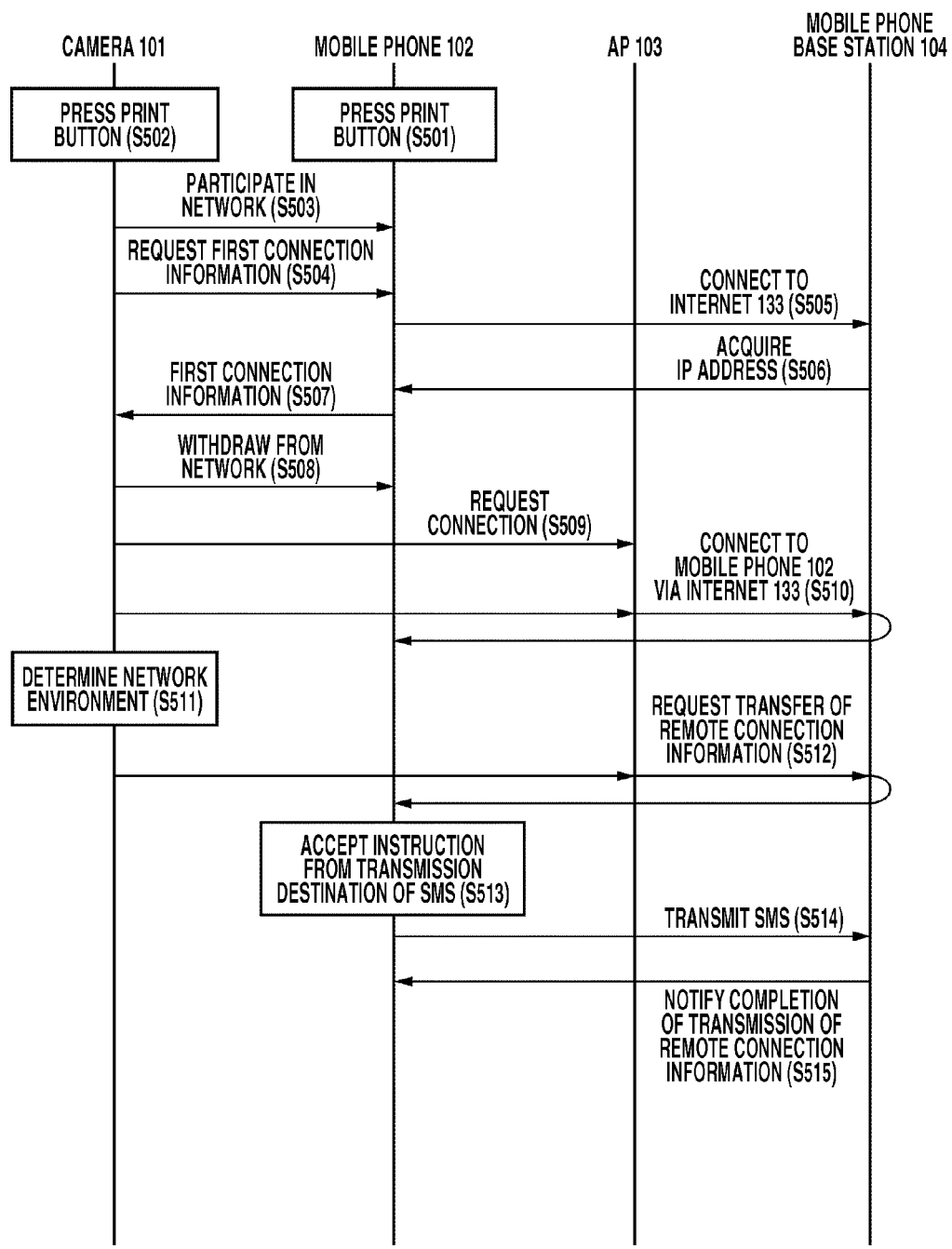
FIG. 5 is a sequence chart

FIG. 5 is a sequence chart illustrating a remote connection between the camera 101 and the printer 151. FIG. 6A is a flowchart that is realized by the control unit 201 of the camera 101 reading out a program stored in the storage unit 202 when the camera 101 remotely connects to the printer 151. Additionally FIG. 6B is a flowchart that is realized by the control unit 251 of the mobile phone 102 reading out a program stored in the storage unit 252. In the present exemplary embodiment, the AP 103 has already constructed the network 132.

In step S501 and step S651 a user presses the print button 258 of the mobile phone 102, and then in step S652, the construction unit 351 of the mobile phone 102 constructs the network 131. In step S502 and step S601 a user presses the print button 208 of the camera 101, in step S503 and step S602, the detection unit 301 of the camera 101 detects the network 131, and the participation unit 302 causes the camera to participate in the detected network 131. This enables direct communication between the camera 101 and the mobile phone 102.

Alternatively, without the instruction from a user (i.e., press-down of the print button 208), the mobile phone 102 may construct the network 131 in response to applications running on the camera 101 and the mobile phone 102, so that the camera 101 participates in the network 131. In other cases, the camera 101 may construct the network 131, so that the mobile phone 102 participates in the network 131.

In step S504 and step S603, after the camera 101 joins the network 131, the acquisition unit 303 requests, through the network 131, the mobile phone 102 to transfer first connection information (e.g., IP address and encryption key of the mobile phone 102) that is used to connect the camera 101 to the mobile phone 102 via a public wireless network. In step S653 when the wireless LAN unit 256 of the mobile phone 102 receives the request for connection information, in step S505 and step S654, the connection unit 352 connects to the Internet 133 via the telephone base station 104. In step S506 and step S655, the acquisition unit 353 acquires an IP address of the mobile phone 102 from a DHCP server (not illustrated) on the Internet 133.

In step S507 and step S656, after the acquisition of the IP address, the notification unit 354 directly transmits first connection information including the IP address to the camera 101. The encryption key necessary to connect the camera 101 to the mobile phone 102 through a public wireless network is stored in the mobile phone 102 in advance, and thereby the mobile phone 102 transmits the encryption key to the camera 101. In step S604 the acquisition unit 303 of the camera 101 acquires the first connection information from the mobile phone 102, and then in step S508 and step S605, the withdrawal unit 304 causes the camera 101 withdraw from the network 131. In step S657, the detection unit 355 of the mobile phone 102 detects the withdrawal of the camera 101 from the network 131, in step S658, the waiting unit 356 waits for connection of the camera 101 through the Internet 133 and the telephone base station 104 via a public wireless network.

In step S509 and step S606, after the withdrawal of the camera 101 from the network 131, the connection unit 305 connects to the AP 103. In the present exemplary embodiment, the camera 101 outputs association request (request for connection) to the AP 103 to connect to the AP 103. After the camera 101 connects to the AP 103, the AP 103 assigns a private address to the camera 101.

In step S510 and step S607, the connection unit 305 connects to the mobile phone 102 through a public wireless network, using the first connection information acquired in step S604. In step S608, the environment determination unit 307 determines whether the connection unit could successfully connect to the mobile phone 102 through a public wireless network. When the environment determination unit 307 determines the connection unit could successfully connect to the mobile phone 102 (YES in step S608), the process proceeds to S610; when the environment determination unit 307 determines the connection unit failed to connect to the mobile phone 102 (NO in step S608), the process proceeds to step S609. The latter case happens when the connection of the camera 101 to the Internet 133 is rejected by the AP 103 for example.

The camera 101 can successfully connect to the mobile phone 102 through a public wireless network, via the AP 103, the Internet 133, and the telephone base station 104 in sequence. After the successful connection through a public wireless network, the waiting unit 356 of the mobile phone 102 waits for a data reception request from the camera 101 through the public wireless network.

In step S609, the environment determination unit 307 determines the network environment of the network 132 to be the network environment "d", and the process proceeds to step S611. On the other hand in step S610, the camera 101 performs the environment determination process (S511) illustrated in FIG. 7A to determine the network environment of the camera 101.

In step S701, the AP determination unit 321 determines whether the network 132 constructed by the connected AP 103 is a home network or a public wireless LAN. For the determination, the AP determination unit 321 transmits an Address Resolution Protocol (ARP) packet to acquire a MAC address of the AP 103. The AP determination unit 321 then compares the acquired MAC address with a MAC address stored in the storage unit 202. When the acquired MAC address is identical to the MAC address stored in the storage unit 202 as comparison result, the AP determination unit 321 determines the network 132 to be a home network, and the process proceeds to step S703. When the acquired MAC address is different from the MAC address stored in the storage unit 202, the AP determination unit 321 determines the network 132 to be a public wireless LAN, and the process proceeds to step S702. Herein, the AP 103 is determined to construct a home network, and the process proceeds to step S703.

Figure 7A:
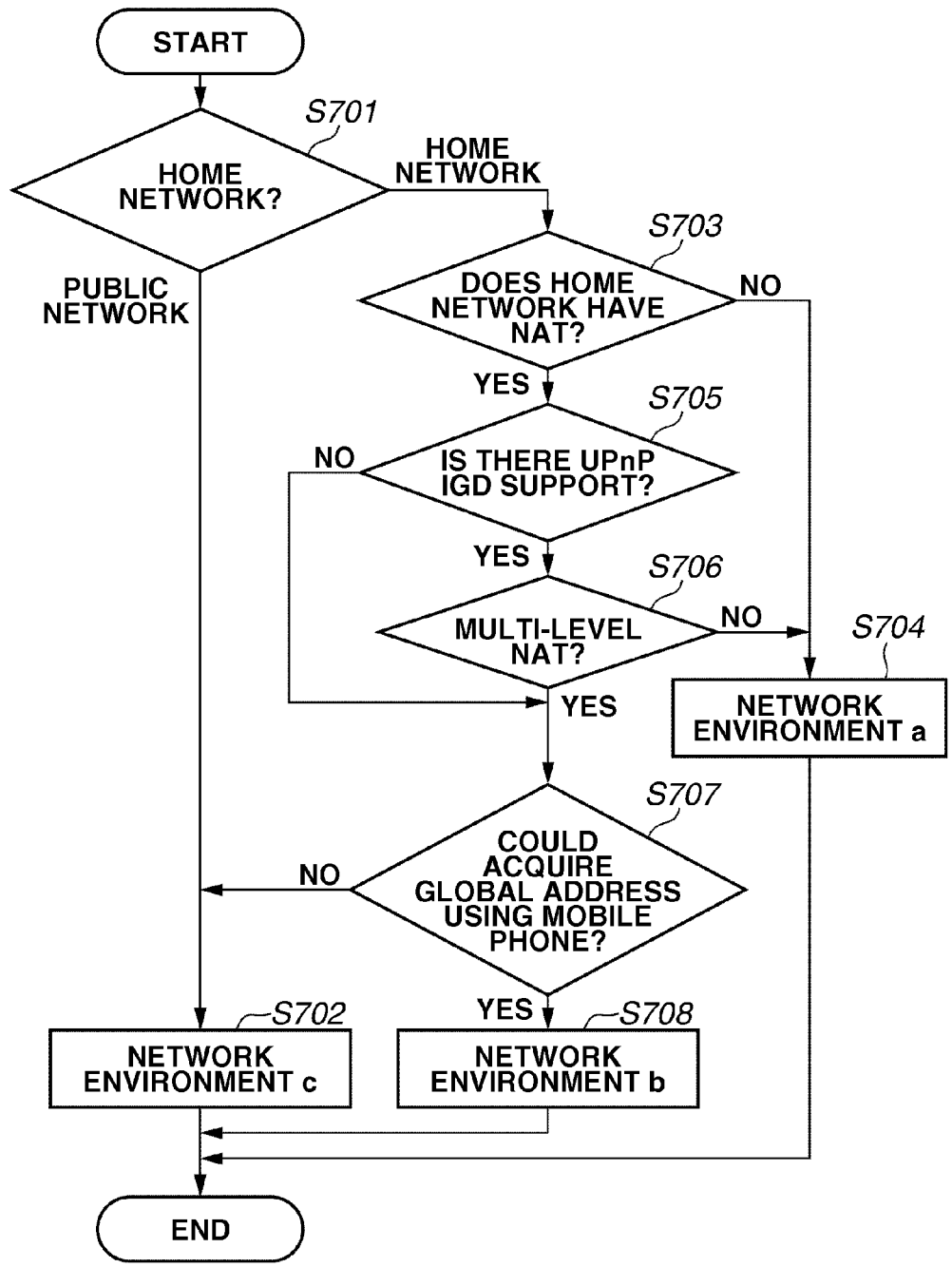

In step S702, the environment determination unit 307 determines the network environment of the network 132 to be the network environment "c", which ends the process in the flowchart illustrated in FIGS. 7A to 7C. In other words, the environment determination unit 307 determines the network 132 to be the network that is not allowed to accept connection request from the Internet 133.

In step S703, the NAT determination unit 322 determines whether the network 132 has NAT. More specifically, the NAT determination unit 322 makes the determination based on the fact whether the IP address attached to the camera 101 is a global address or a private address. When the IP address is a global address, the NAT determination unit 322 determines the network 132 does not have NAT. When the IP address is a private address, the NAT determination unit 322 determines the network 132 has NAT.

When the NAT determination unit 322 determines the network 132 does not have NAT (No in step S703), the environment determination unit 307 determines the network environment of the network 132 to be the network environment "a", which ends the process in the flowchart illustrated in FIGS. 7A to 7C. When the NAT determination unit 322 determines the network 132 has NAT (Yes in step S703), the process proceeds to step S705. Herein, it is determined that the network 132 has NAT, and the process proceeds to step S705.

In step S705, the IGD determination unit 323 determines whether the network 132 includes an apparatus having IGD function. More specifically, the IGD determination unit 323 determines whether the network 132 includes an apparatus having IGD function, using Simple Service Discovery Protocol (SSDP) defined by Universal Plug and Play (UPnP). The IGD determination unit 323, however, may make the determination based on other protocol such as Bonjour (trademark). When the IGD determination unit 323 determines the network 132 includes an apparatus having IGD function (YES in step S705), the process proceeds to step S706. When the IGD determination unit 323 determines the network 132 does not include an apparatus having IGD function (NO in step S705), the process proceeds to step S707. Herein, the AP 103 does not have IGD function, and the process proceeds to step S707.

In step S706, the NAT determination unit 322 determines whether the network 132 has a multi-level NAT. More specifically, for the determination, the NAT determination unit 322 examines the path an IP packet passes to reach an arbitrary external server by using a command such as tracert, and counts the number of conversions of the IP address.

When the network 132 does not have a multi-level NAT (No in step S706), the camera 101 is able to recognize a global address that is used when the AP 103 transmits a packet to the Internet 133, by the IGD function. Accordingly, the process proceeds to step S704, where the environment determination unit 307 determines the network 132 to be the network environment "a".

On the other hand when the network 132 has a multi-level NAT (YES in step S706), the camera 101 is not able to recognize a global address that is used when the AP 103 transmits a packet to the Internet 133, even through the IGD function. In this case, the process proceeds to step S707, where the acquisition determination unit 324 determines whether a global address corresponding to the camera 101 can be acquired through the mobile phone 102.

The processing in step S707 is described in more detail with reference to FIGS. 7B and 7C. FIG. 7B is a flowchart that is realized by the control unit 201 of the camera 101 reading out a program stored in the storage unit 202. FIG. 7C is a flowchart executed by the control unit 251 of the mobile phone 102 reading out a program stored in the storage unit 252.

In step S751, the acquisition determination unit 324 transmits a data reception request to the mobile phone 102 via the AP 103. In step S771, the mobile phone 102 receives the request, and in S772, the mobile phone 102 notifies the camera 101 that the mobile phone 102 is ready to receive data and waits for data from the camera 101. In step S752, the camera 101 requests the mobile phone 102 via the AP 103 for acquisition of a global address. In step S753, the camera 101 transmits arbitrary data to the mobile phone 102 via the AP 103 and the Internet 133. Every data transmitted from the camera 101 to the mobile phone 102 via the Internet 133 contains a global address of the camera 101 that is attached thereto by the AP 103.

In this case, the camera 101 transmits the data to the mobile phone 102 using a port number that is used in communication with the printer 151. This allows the mobile phone 102 to know the port number that is assigned to the Internet 133 by the NAT (NAPT) function of the AP 103 when the camera 101 communicates with the printer 151.

In step S773, the mobile phone 102 receives the data from the camera 101. In step S774, the mobile phone 102 analyzes the data received from the camera 101 via the Internet 133 to acquire a global address of the camera 101. In step S775, the mobile phone 102 notifies the camera 101 of the acquired global address of the camera 101. In step S754, the environment determination unit 307 of the camera 101 acquires the global address of the camera 101. The environment determination unit 307 of the camera 101 then transmits arbitrary data to the mobile phone 102 via the AP 103 at predetermined intervals to acquire a global address. Consequently, even when there is a change in the global address of the camera 101, the camera 101 is able to recognize the changed global address.

As described above, the camera 101 is able to acquire connection information (e.g., global address, port number, and encryption key) assigned thereto by the AP 103, without storage of the connection information to an external server in advance. In addition, the connection information of the camera 101 is not transmitted to external servers, which results in no fear of leakage of the connection information from any external server, providing high security.

After acquisition of the global address of the camera 101 as described above (Yes in step S707), the process proceeds to step S708, where the network environment of the network 132 is determined to be the network environment "b". When a global address of the camera 101 is not acquired (NO in step S707), the process proceeds to step S702, where the network environment of the network 132 is determined to be the network environment "c". Herein, assume that a global address of the camera 101 is acquired using the mobile phone 102, and the network environment is determined to be the network environment "b".

The above description is an example of an environment determination process, and the process may have different determination steps or may be performed in a different order. For example, the determination whether information of an external address can be acquired using a mobile phone may be made before the determination of existence of IGD function, so that, when it is determined that the information cannot be acquired, the determination whether the NAT supports IGD function may be made.

If an event such as error occurs during the process to determine a network environment, the mobile phone 102 again constructs the network 131, and the camera 101 participates in the network 131. Accordingly, the mobile phone 102 can notify the camera 101 of the event occurred through the network 131. For example, the mobile phone 102 regularly transmits a signal to the camera 101 to request a response from the camera 101, so that when the mobile phone 102 does not receive a response to the signal from the camera 101, the mobile phone 102 detects a change in a global address of the camera 101. Upon detection of the change of global address of the camera 101 as described above, the mobile phone 102 notifies the camera 101 of the change in global address, through the network 131. The mobile phone 102 may request the camera 101 to transmit arbitrary data to the mobile phone 102 via the Internet 133. In step S774, when the mobile phone 102 fails to acquire a global address of the camera 101, the mobile phone 102 notifies the camera 101 of the failure, through the network 131. Upon reception of the notifications, the camera 101 again performs the global address acquisition process (the process illustrated in FIGS. 7B and 7C).

After the process to determine a network environment where the camera 101 belong, in step S512 and S611, the request unit 308 requests the mobile phone 102 to transmit remote connection information of the camera 101. The remote connection information is used to connect the printer 151 to the camera 101 through the Internet 133. Specifically the remote connection information contains the global address, port number encryption key of the camera 101, and the network environment information of the network 132 where the camera 101 belongs. In step S659, the mobile phone 102 receives the request, and in step S513 and step S660, the mobile phone 102 accepts an instruction about the transmission destination of a short Message Service (SMS) that contains the remote connection information, through a user operation. More specifically, the instruction is made when a user specifies a phone number of a transmission destination from a phone directory displayed on the mobile phone 102. In step S514 and step S661, after the specification of the phone number, the mobile phone 102 generates and transmits an SMS. Instead of SMS, the mobile phone 102 may use Enhanced Messaging Service (EMS), Multimedia Messaging Service (MMS), or electronic mail system. In step S515, step S662, after the SMS transmission, the mobile phone 102 transmits a notification of the completion of transmission of the remote connection information to the camera 101. In step S612, the request unit 308 receives the notification of the completion of transmission of the remote connection information. Herein, the mobile phone 102 transmits an SMS, which is received at the mobile phone 152.

Figure 8:
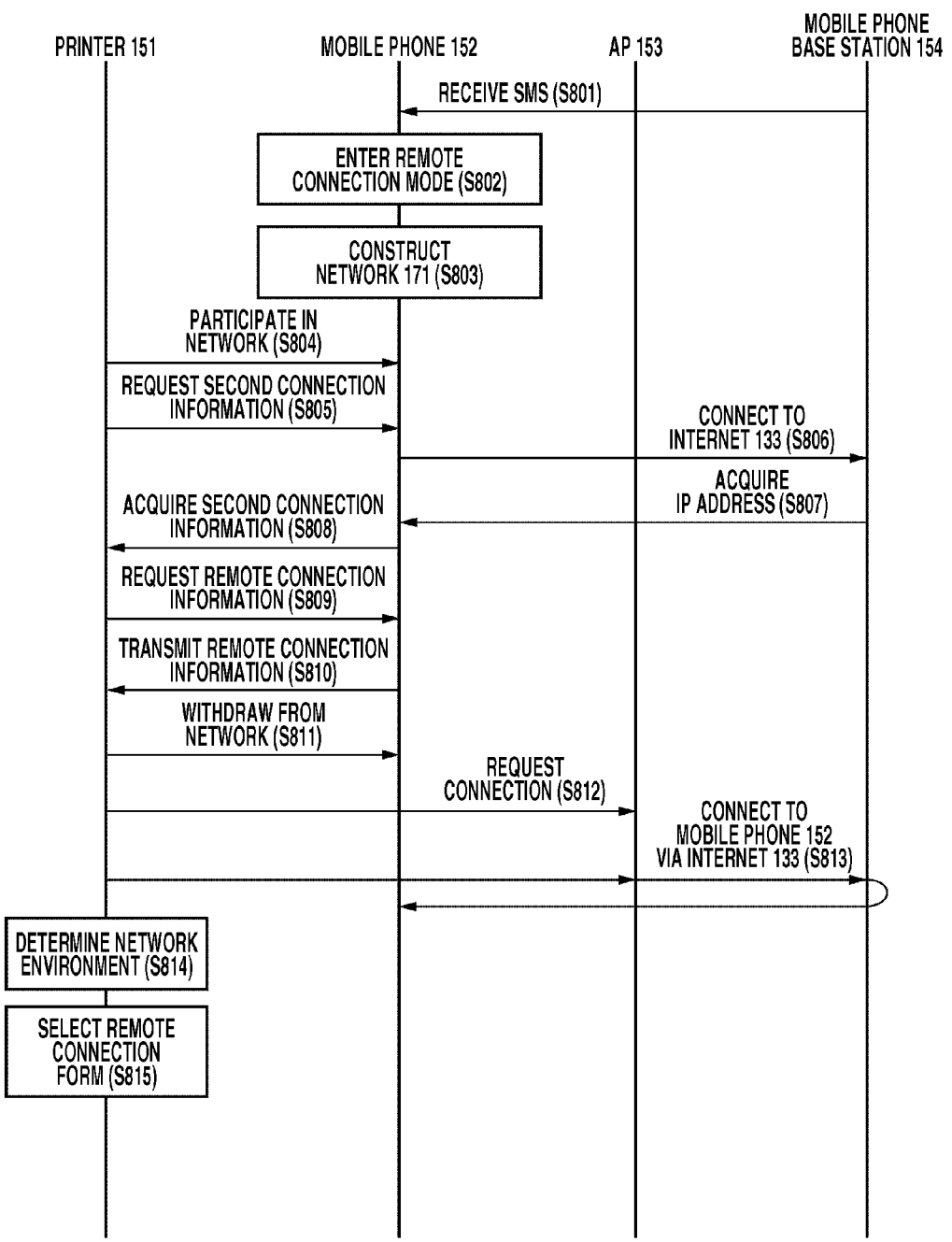
FIG. 8 is a sequence chart.

FIG. 8 is a sequence chart performed after the mobile phone 152 receives an SMS from the mobile phone 102. In step S801, the mobile phone 152 receives an SMS via a mobile phone base station 154, and in step S802, enters a remote connection mode. The mobile phone 152 may enter the remote connection mode by an instruction from a user after the mobile phone 152 notifies the user of the reception of the SMS. In the remote connection mode, in step S803, the mobile phone 152 constructs a network 171 complying with ad hoc mode. In step S804, the printer 151 detects and participates in the network 171. This enables direct communication between the printer 151 and the mobile phone 152.

In step S805, the printer 151 requests the mobile phone 152 for second connection information (i.e., IP address and encryption key) necessary for connection via a public wireless communication. Upon reception of the request for the second connection information, in step S806, the mobile phone 152 connects to the Internet 133 via the telephone base station 154, and in step S807, acquires an IP address of the mobile phone 152 from a DHCP server (not illustrated) on the Internet 133. In step S808, the mobile phone 152 notifies the printer 151 of the acquired second connection information containing the IP address.

In step S809, the printer 151 further requests the mobile phone 152 for remote connection information of the camera 101. Upon the request, in step S810, the mobile phone 152 transmits the remote connection information of the camera 101 acquired from the SMS, to the printer 151. Upon reception of the remote connection information of the camera 101, in step S811, the printer 151 withdraws from the network 171, and in step S812, the printer 151 connects to the AP 153. In step S813, the printer 151 connects to the mobile phone 152 via the Internet 133. In step S814, the printer 151 performs the environment determination process in FIG. 7A, and determines the environment of the network 172.

Figure 9:
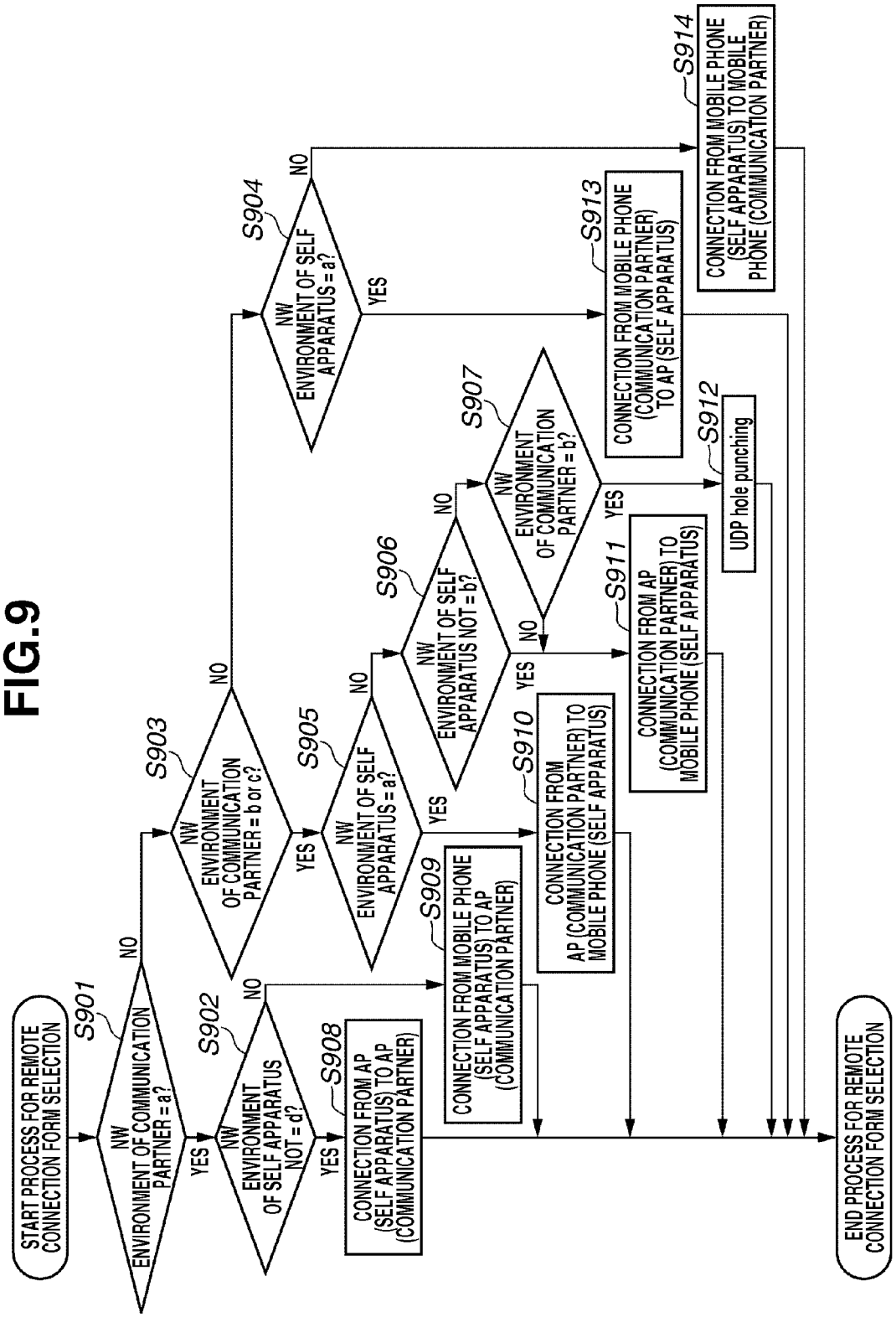
FIG. 9 is a flowchart.

As described above, when the environments of the networks 132 and 172 where the camera 101 and the printer 151 belong are determined respectively, in step S815, the selection unit of the printer 151 performs the flowchart illustrated in FIG. 9 to select a remote connection form. Hereinafter, the network environment of the camera 101 (indicated as "NW ENVIRONMENT OF COMMUNICATION PARTNER" in FIG. 9) refers to the environment of the network 132. Whereas the network environment of the printer 151 (indicated as "NW ENVIRONMENT OF SELF APPARATUS" in FIG. 9) refers to the environment of the network 172.

In step S901, the printer 151 determines whether the network environment of the camera 101 is the network environment "a". When the camera 101 is in the network environment "a" (YES in step S902), the process proceeds to S902, and otherwise (NO in step S902), the process proceeds to S903. In step S902, the printer 151 determines whether the network environment of the self apparatus is the network environment "d". When the self apparatus is not in the network environment "d" (NO in step S902), in step S908, the printer 151 selects a remote connection form that connects the printer 151 to the AP 153, the AP 103, and finally to the camera 101 in this order, and the remote connection form selection process ends. When the self apparatus is in the network environment "d" (YES in S902), in S909, the printer 151 selects a remote connection form that connects the printer 151 to the mobile phone 152, the telephone base station 154, the AP 103, and finally to the camera 101 in this order, and the remote connection form selection process ends. As described above, the connection via the AP 103, is selected preferentially, so that the cost is reduced compared with the connection through the mobile phone 102. In other words, the connection via the AP 103 results in lower communication cost and higher communication speed than the case with the connection through the mobile phone 102. Furthermore, the connection via the AP 103 allows the communication band between the mobile phone 102 and the telephone base station 104 to be used in other applications, enhancing the convenience.

In step S903, the printer 151 determines whether the network environment of the camera 101 is the network environment "b" or "c". When the printer 151 determines the camera 101 is in the network environment "b" or "c" (YES in step S903), the process proceeds to step S905, and otherwise (NO in step S903), the process proceeds to step S904. In step S904, the printer 151 determines whether the network environment of the printer 151 is the network environment "a". When the printer 151 is in the network environment "a" (YES in step S904), in S913, the printer 151 selects a remote connection form that connects the camera 101 to the mobile phone 102, the telephone base station 104, the AP 153, and finally to the printer 151 in this order, and the remote connection form selection process ends. When the printer 151 is not in the network environment "a" (NO in step S904), in step S914, the printer 151 selects a remote connection form that connects the printer 151 to the mobile phone 152, the telephone base station 154, the telephone base station 104, the mobile phone 102, and finally to the camera 101 in this order, and the remote connection form selection process ends.

Herein, when the printer 151 connects to the digital camera 101, the mobile phones 102 and 152 each start Gateway function (i.e., the function as an access point mode to connect to the Internet 133) in advance through a user operation. As a result, the printer 151 can connect to the digital camera 101 through the mobile phones 102 and 152.

In step S905, the printer 151 determines whether the network environment of the apparatus itself is the network environment "a". When the printer 151 is in the network environment "a" (YES in step S905), in S910, the printer 151 selects a remote connection form that connects the camera 101 to the AP 103 and the AP 153, and finally to the printer 151 in this order, and the remote connection form selection process ends.

When the printer 151 is not in the network environment "a" (NO in step S905), in step S906, the printer 151 determines whether the network environment of the apparatus itself is the network environment "b". When the printer 151 is not in the network environment "b" (YES in step S906), in step S911, the printer 151 selects a remote connection form that connects the camera 101, the AP 103, the telephone base station 154 and the mobile phone 152, and finally to the printer 151 in this order, and the remote connection form selection process ends.

When the printer 151 is in the network environment "b" (NO in step S906). In step S907, the printer 151 determines whether the network environment of the camera 101 is the network environment "b". When the camera 101 is in the network environment "b" (YES in step S907), in step S912, the printer 151 selects a remote connection form that uses UDP hole punching for connection, and the remote connection form selection process ends. When the camera 101 is not in the network environment "b" (NO in step S907), in step S911, the printer 151 selects a remote connection form that connects the camera 101 to the AP 103, the telephone base station 154, and the mobile phone 152, and finally to the printer 151 in this order, and the remote connection form selection process ends.

In step S812, the printer 151 notifies the mobile phone 152 of the external connection information (global address) of the printer 151 and the remote connection form information selected by the connection selection unit 309. The mobile phone 152 generates an SMS that contains the external connection information and the remote connection form information from the printer 151, and transmits the SMS to the mobile phone 102. The mobile phone 102 notifies the camera 101 of the external connection information and the remote connection form information of the printer 151. The camera 101 and the printer 151 then connect to each other according to the remote connection form information. In this case, the side that accepts the connection performs an authentication process.

As described above, the connection between apparatuses is automatically performed depending on the network environment of each of the apparatuses, and thereby a user can connect apparatuses to each other without being conscious of the network environments.

In the above exemplary embodiment, the camera 101 connects to the mobile phone 102 via the Internet 133 in S510, so that the camera 101 communicates with the mobile phone 102 based on the connection. Alternatively, the mobile phone 102 may connects to the camera 101 via the Internet 133 after the camera 101 connects to the mobile phone 102. This simplifies the determination of the possibility of connection to the camera 101 through an external network, as compared with the case in FIG. 7A.

A second exemplary embodiment is described. In the second exemplary embodiment, a network environment of each of the related apparatuses can be determined more easily than in the first exemplary embodiment.

A communication system of the present exemplary embodiment has the same network configuration as that illustrated in FIG. 1 as in the first exemplary embodiment. A camera 101 and a printer 151 each have the same hardware configuration as that illustrated in FIG. 2A as in the first exemplary embodiment. A mobile phone 102 has the same hardware configuration as that illustrated in FIG. 2B as in the first exemplary embodiment. The software function block diagram of the camera 101 is the same as that illustrated in FIG. 3A in the first exemplary embodiments. The software function block diagram of the mobile phone 102 is the same as that illustrated in FIG. 3B in the first exemplary embodiment.

Figure 10:
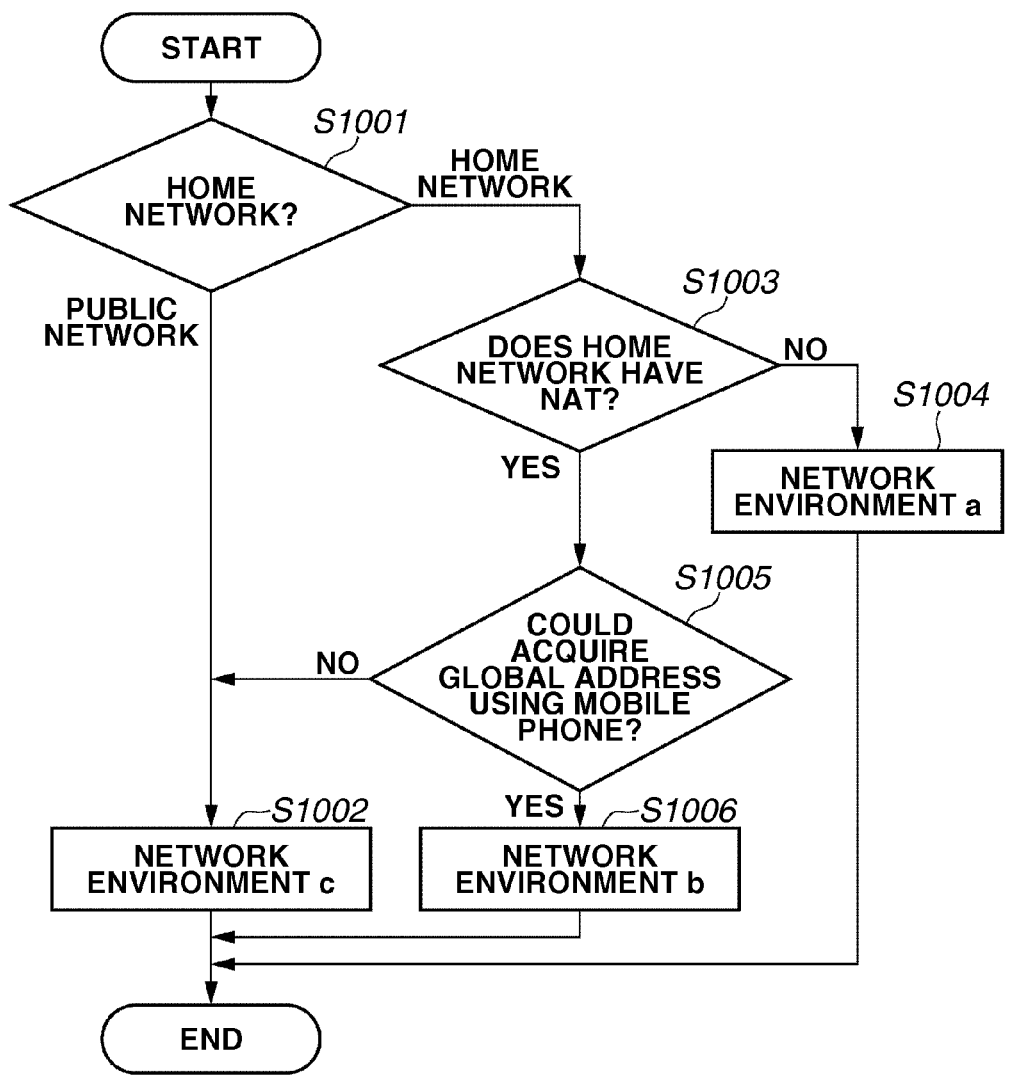
FIG. 10 is a flowchart.

FIG. 10 illustrates an environment determination process that is executed by the camera 101 and the printer 151 respectively reading out a program stored in their storage units when the camera 101 and the printer 151 remotely connect to each other. The operations of each apparatus until the environment determination process is performed are the same as in the first exemplary embodiment. The operations of the camera 101 are described below.

In step S1001, the camera 101 determines whether the network 132 constructed by the AP 103 where the camera 101 connects is a home network or a public wireless LAN. When it is determined the network 132 is a public wireless LAN, the process proceeds to step S1002, where the AP determination unit 321 determines the network environment of the camera 101 to be the network "c", and the environment determination process in FIG. 10 ends.

On the other hand when it is determined the network 132 is a home network in step S1001, the process proceeds to step S1003, where the NAT determination unit 322 determines whether there is NAT in the network 132. When there is no NAT in the network 132 (NO in step S1003), the process proceeds to S1004, where the AP determination unit 321 determines the network environment of the camera 101 to be the network environment "a", and the environment determination process in FIG. 10 ends. On the other hand, when there is NAT in the network 132 (YES in step S1003), the process proceeds to S1005, where the acquisition determination unit 324 determines whether it is possible to acquire a global address corresponding to the camera 101 by using the mobile phone 102. The determination is illustrated in detail in FIGS. 7B and 7C, and is similar to that in the first exemplary embodiment, so that the description is omitted here. When the acquisition determination unit 324 determines the acquisition possible (YES in step S1005), the process proceeds to step S1006, where the AP determination unit 321 determines the network environment of the camera 101 to be the network environment "b", and the environment determination process in FIG. 10 ends. On the other hand, when acquisition determination unit 324 determines the acquisition impossible (NO in step S1005), the process proceeds to step S1002, where the AP determination unit 321 determines the network environment of the camera 101 to be the network environment "c", and the environment determination process in FIG. 10 ends.

The operations of each of other apparatuses are similar to those in the first exemplary embodiment, so that the description is omitted here. The above process with these operations facilitates the determination of a network environment of each apparatus, as compared with that in the first exemplary embodiment.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-242463 filed Oct. 28, 2010 and No. 2010-242464 filed Oct. 28, 2010, which are hereby incorporated by reference herein in their entirety.

What is claimed is:

1. A communication apparatus to communicate with a partner apparatus, comprising:
 a processor; and
 a memory configured to store at least one program comprising program code;
 a transmission unit configured to directly transmit address information of the communication apparatus to the partner apparatus by direct wireless communication between the communication apparatus and the partner apparatus;
 a reception unit configured to receive, from the partner apparatus using a communication path including a relay apparatus and being different from a communication path that is used when the transmission unit transmits the address information, data to which a destination address is set based on the transmitted address information;
 an acquisition unit configured to acquire global address information corresponding to the partner apparatus from the received data; and
 a notification unit configured to notify the partner apparatus of the acquired global address information,
 wherein an operation of at least one of the transmission unit, the reception unit, the acquisition unit, the acquisition unit and the notification unit is performed by the processor's execution of the at least one program stored in the memory.

2. The communication apparatus according to claim 1, wherein the reception unit receives the data from the partner apparatus at predetermined intervals, and
 wherein the acquisition unit acquires the global address information at predetermined intervals.

3. The communication apparatus according to claim 1, further comprising a second notification unit configured to, when the acquisition unit failed to acquire the global address information, notify the partner apparatus of the failure.

4. The communication apparatus according to claim 1, further comprising a request unit configured to request the partner apparatus for retransmission of the data when a change in the global address is detected.

5. A system wherein a first communication apparatus communicates with a second communication apparatus via a relay communication apparatus,
wherein the first communication apparatus comprises:
a processor; and
a memory configured to store at least one program comprising program code;
a transmission unit configured to directly transmit address information of the first communication apparatus to the second communication apparatus by direct wireless communication between the first communication apparatus and the second communication apparatus;
a first reception unit configured to receive, from the second communication apparatus using a communication path including a relay apparatus and being different from a communication path that is used when the transmission unit transmits the address information, data to which a destination address is set based on the transmitted address information;
an acquisition unit configured to acquire global address information corresponding to the second communication apparatus from the received data; and
a notification unit configured to notify the second communication apparatus of the acquired global address information, and
wherein the second communication apparatus comprises:
a processor; and
a memory configured to store at least one program comprising program code;
a transmission unit configured to transmit the data to the first communication apparatus; and
a second reception unit configured to receive the notified global address information from the first communication apparatus,
wherein an operation of at least one of the transmission unit, the reception unit, the acquisition unit, the acquisition unit and the notification unit is performed by the processor's execution of the at least one program stored in the memory.

6. A method of controlling a communication apparatus to establish communication with a partner apparatus, comprising:
directly transmitting address information of the communication apparatus to the partner apparatus by direct wireless communication between the communication apparatus and the partner apparatus;
receiving, from the partner communication using a communication path including a relay apparatus and being different from a communication path that is used when the transmission unit transmits the address information, data to which a destination address is set based on the transmitted address information;
acquiring global address information corresponding to the partner apparatus from the received data; and
notifying the partner apparatus of the acquired global address information.

7. The method according to claim 6, wherein the receiving receives the data from the partner apparatus at predetermined intervals, and
wherein the acquiring the global address information at predetermined intervals.

8. The method according to claim 6, further comprising notifying the partner apparatus of the failure when the acquiring failed to acquire the global address information.

9. The method according to claim 6, further comprising a requesting the partner apparatus for retransmission of the data when a change in the global address is detected.

10. A non-transitory computer-readable storage medium storing a program for causing a computer to operate as the apparatus according to claim 1.

11. The non-transitory computer-readable storage medium according to claim 10, wherein the reception unit receives the data from the partner apparatus at predetermined intervals, and
wherein the acquisition unit acquires the global address information at predetermined intervals.

12. The non-transitory computer-readable storage medium according to claim 10, wherein the communication apparatus further comprises a second notification unit configured to, when the acquisition unit failed to acquire the global address information, notify the partner apparatus of the failure.

13. The non-transitory computer-readable storage medium according to claim 10, wherein the communication apparatus further comprises a request unit configured to request the communication partner for retransmission of the data when a change in the global address is detected.

\* \* \* \* \*